United States Patent [19]
Sanz et al.

[11] 3,865,495
[45] Feb. 11, 1975

[54] CUVETTE FOR A MICROSPECTROPHOTOMETER

[75] Inventors: Manuel C. Sanz; Georges Revillet, both of Geneva, Switzerland; Edgar G. Johnson, Jr., Huntsville, Ala.

[73] Assignee: Micromedic Systems, Inc., Philadelphia, Pa.

[22] Filed: May 24, 1973

[21] Appl. No.: 363,444

[30] Foreign Application Priority Data
Feb. 23, 1973   Canada............................ 164480

[52] U.S. Cl. ............................................ 356/246
[51] Int. Cl. .............................................. G01n 1/10
[58] Field of Search ............ 356/181, 244, 246, 206

[56] References Cited
UNITED STATES PATENTS

| | | | |
|---|---|---|---|
| 3,518,011 | 6/1970 | Rochte................................. | 356/181 |
| 3,591,801 | 7/1971 | Watson............................ | 356/206 X |
| 3,751,173 | 8/1973 | Sanz et al. ........................... | 356/246 |
| 3,795,450 | 3/1974 | Munk.................................. | 356/246 |

FOREIGN PATENTS OR APPLICATIONS

| | | | |
|---|---|---|---|
| 23,798 | 10/1969 | Japan................................. | 356/244 |
| 1,124,144 | 8/1968 | Great Britain...................... | 356/246 |

*Primary Examiner*—Ronald L. Wibert
*Assistant Examiner*—F. L. Evans

[57] ABSTRACT

The present invention is concerned with a spectrophotometer useful for determining light transmission of microsamples. It is particularly concerned with a spectrophotometer system using an improved microcuvette and extremely small optical elements for providing and acting upon the light beam that is used in determining the light-transmission characteristics of the sample. It is more particularly concerned with a double-cavity cuvette for receiving in one of the cavities of the cuvette a comparison or reference material and, in the other, the sample to be measured. Even more particularly it is concerned with a double-cavity micro-cuvette particularly adapted for utilizing a shifted-beam light system in which the beam is alternately refracted in different directions to direct it alternately through one cavity and then the other.

2 Claims, 6 Drawing Figures

PATENTED FEB 11 1975

CUVETTE FOR A MICROSPECTROPHOTOMETER

DESCRIPTION OF THE INVENTION

It is an object of the present invention to provide a micro-cuvette having two cavities arranged closely together so that one can receive a sample to be tested and the other a reference material, the cavities being arranged in parallel relationship so that the beam of light which passes longitudinally through one cavity of the cuvette may be shifted a very small distance to pass the beam longitudinally through the other of the cavities, thereby enabling one to use an exceptionally small refracting device to alternately shift the light beam from one of the cavities to the other.

It is a further object of the present invention to provide a micro-cuvette having cavities extending parallel to each other but close together, yet separated by a light absorbing septum to prevent transmission of stray signals from the cavity in use through the adjacent cavity and reflection back into the cavity in use, such stray rays being herein termed "cross-talk."

It is another object of the present invention to provide an improved spectrophotometer that is adapted to receive the double-cavity cuvette and thereby make use of exceptionally small optical elements.

Other objects and advantages of the present invention will be apparent from the description hereinafter.

In the drawing illustrating the present invention

Figure 1:
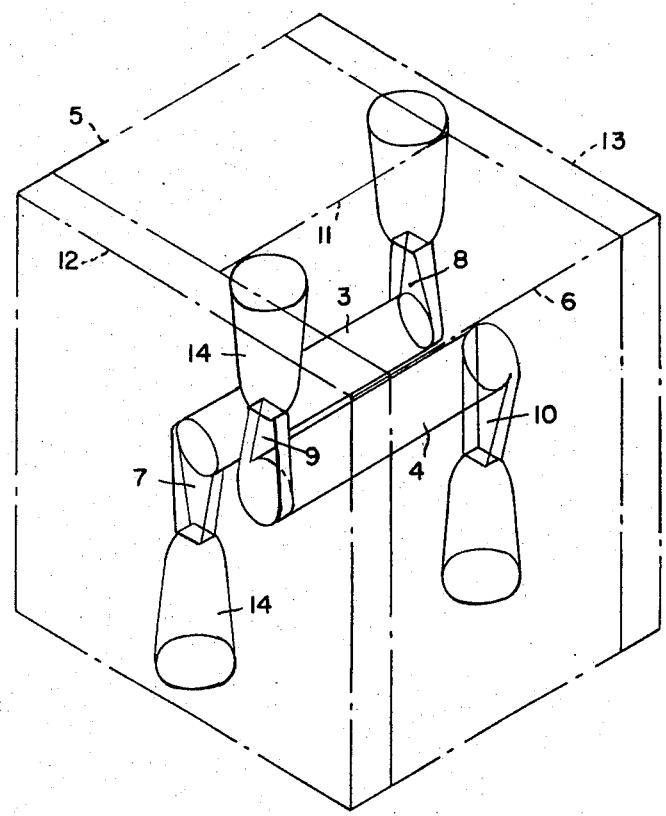
FIG. 1 is a perspective view of the cuvette of the present invention in which the cavities are shown in solid lines and the boundary outlines of the cuvette are shown in dotted lines.
Figure 3:
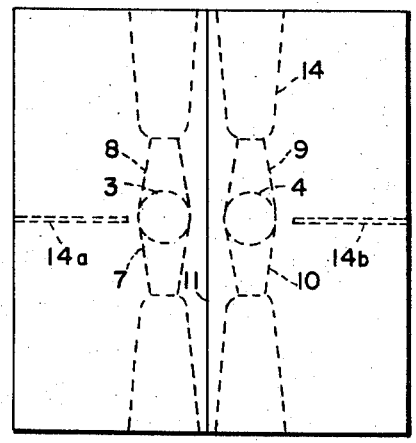
FIG. 3 is an end view of the cuvette.
Figure 2:
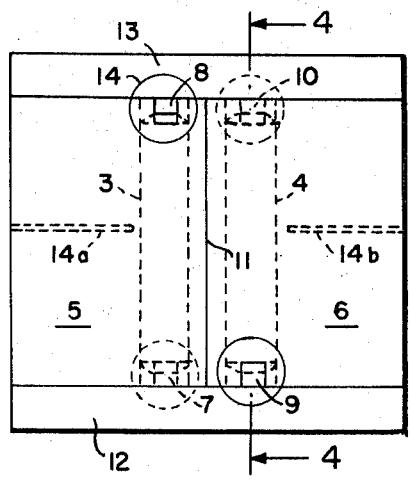
FIG. 2 is a plan view of the cuvette.
Figure 4:
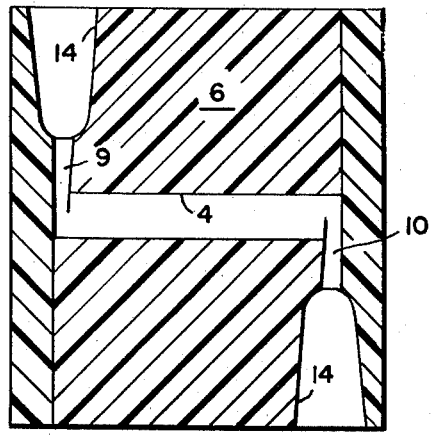
FIG. 4 is a section taken on line 4—4 of FIG. 2.

As shown in FIGS. 1 – 4, the cuvette has two passages, such as cylindrical bores 3 and 4 which extend parallel to each other and are very close together. For example, the distance between centers of the cylindrical cavities or bores may be as low as about 2.5 to 4 millimeters. The bores themselves may be about 1 millimeter in diameter, larger or smaller depending upon the diameter of the light beam that may be employed. Of course, if the cavities are of larger diameter, there should be somewhat greater spacing between the centers of the cavities to assure that the adjacent walls of the cavities are spaced from each other. On the other hand, use of smaller diameter bores 3 and 4 makes it feasible to separate the bores even less than 2.5 mm. when desired. As shown in the drawing the cuvette is most simply constructed of two blocks 5 and 6 which together constitute the main body of the cuvette, the cavity 3 being within block 5 and the cavity 4 being in block 6.

The cavity 3 communicates at its ends with channels 7 and 8 respectively. These channels may be formed in the block 5 after the cavity has been formed, as by cutting away the material of the block. Similarly, cavity 4 communicates at its ends with channels 9 and 10.

The channels at the ends of the cavity are shown directed toward opposite lateral faces of the assembled cuvette. However, they may be directed toward the same lateral face or to adjacent lateral faces. Preferably, however, the channels from adjacent ends of the two cavities are not directed, side by side, to the same face for reasons stated hereinafter.

The materials of the blocks used in forming the cuvette may be glass, quartz, or suitable materials, such as plastic or metal, which are sufficiently resistant to the materials that are expected to be tested in the cuvette. Depending on the materials to be tested it may be desirable in some instances to make the blocks 5 and 6 of completely opaque materials. Besides glass and quartz mentioned, various plastic or metallic materials suitably resistant to the liquids that will be tested in the cuvette and having light-transmission characteristics appropriate for the particular wavelength used in the instrument could be used.

If the blocks 5 and 6 are of opaque materials, they in themselves would serve to prevent "cross-talk" mentioned hereinabove but when these blocks are of a material which is not opaque but transparent or even translucent it is preferred to introduce between blocks 5 and 6 before they are put together a thin septum of opaque material that can be suitably fused or adhered to the interface of the blocks 5 and 6. Examples of such a material include a thin layer of "tape" of glass, silica or the like which contains an opacifying dye or pigment, black or otherwise. The position of this septum is indicated by line 11. Except for the opacity of the septum, it would not be visible in the actual cuvette that is produced.

When assembling blocks 5 and 6 with the septum 11 therebetween, end plates 12 and 13 are placed against the end faces of the assembled blocks. The end plates may be of the same material as the blocks 5 and 6. However they must not be opaque in the areas that will be facing the ends of the cavities after assembly. The other portions of these plates may be opaque if desired. The inside face of the end plates provide end walls to the passages and these walls should be in planes that are perpendicular to the longitudinal axes of the passages. The outside or exposed faces of the plates, at least in the areas aligned with the passages, must lie in planes that are parallel to the planes of the end walls. The assembled blocks 5 and 6, septum 11 and end plates 12 and 13 are cohered or adhered together, preferably by fusion when the materials are of such nature that fusion can cause such cohesion to occur without introducing serious distortions of the components being adhered.

Holes or sockets 14 communicate with the end channels 7 to 10 so that suitable fittings for connecting the ends of tubular conduits, preferably of flexible material, such as polyethylene, rubber, or the like, may be inserted into the sockets and secured therein. The conduits thus connected serve to supply, and receive the effluent or discharge of, a sample liquid in one cavity and of a standard or reference liquid for comparison in the other cavity.

It is important that the channels at the ends of one of the cavities be directed toward different side walls of the cuvette than the channels at the end of the other cavity so that the sockets 14 to the adjacent ends of the cavities extend through adjacent or opposite sides of the cuvette. This arrangement enables the cavities to be placed closer together without seriously weakening the body of the cuvette in the vicinity of the sockets or causing the sockets to overlap or intersect each other as they would if the sockets 14 associated with adjacent ends of the cavities were to extend from the same cuvette surface.

The cuvette may also be provided with small holes 14a and 14b to receive temperature-changing or temperature-measuring devices, such as heating or cooling elements.

Figure 6:
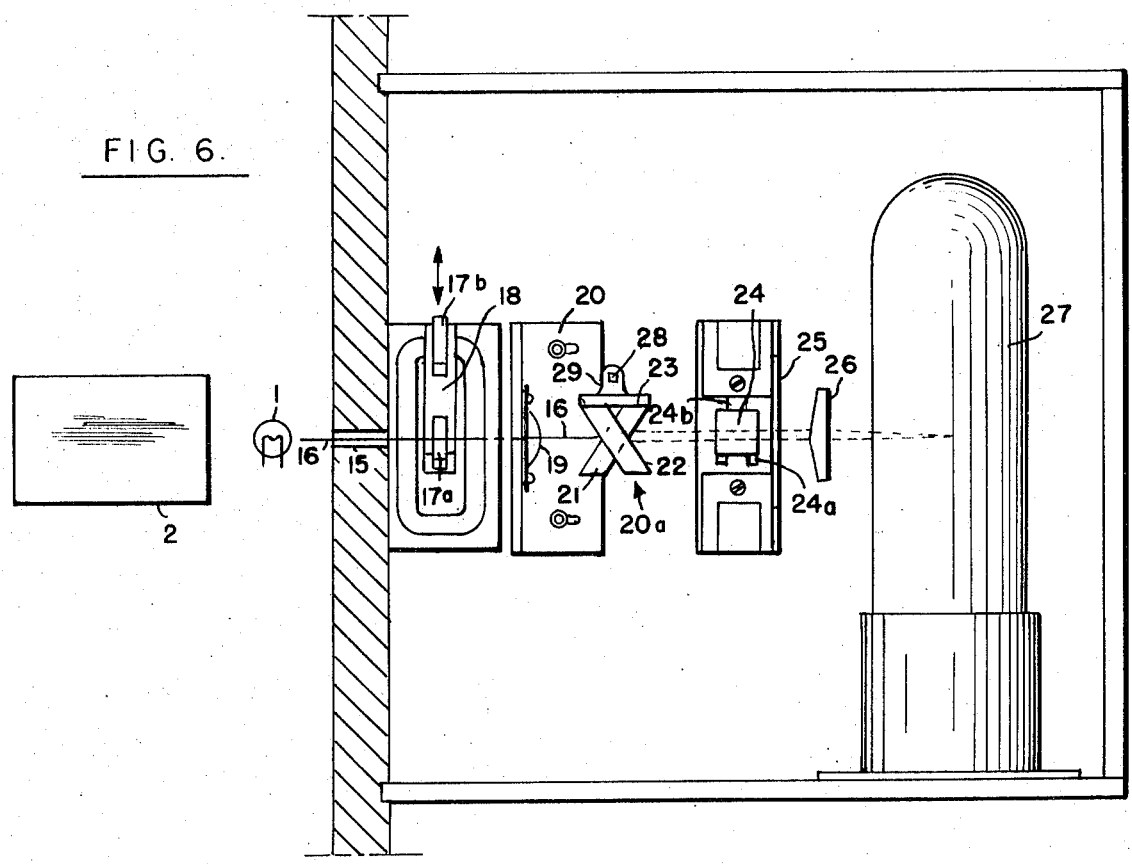
FIG. 6 is a plan view of the optical system shown in FIG. 5.
Figure 5:
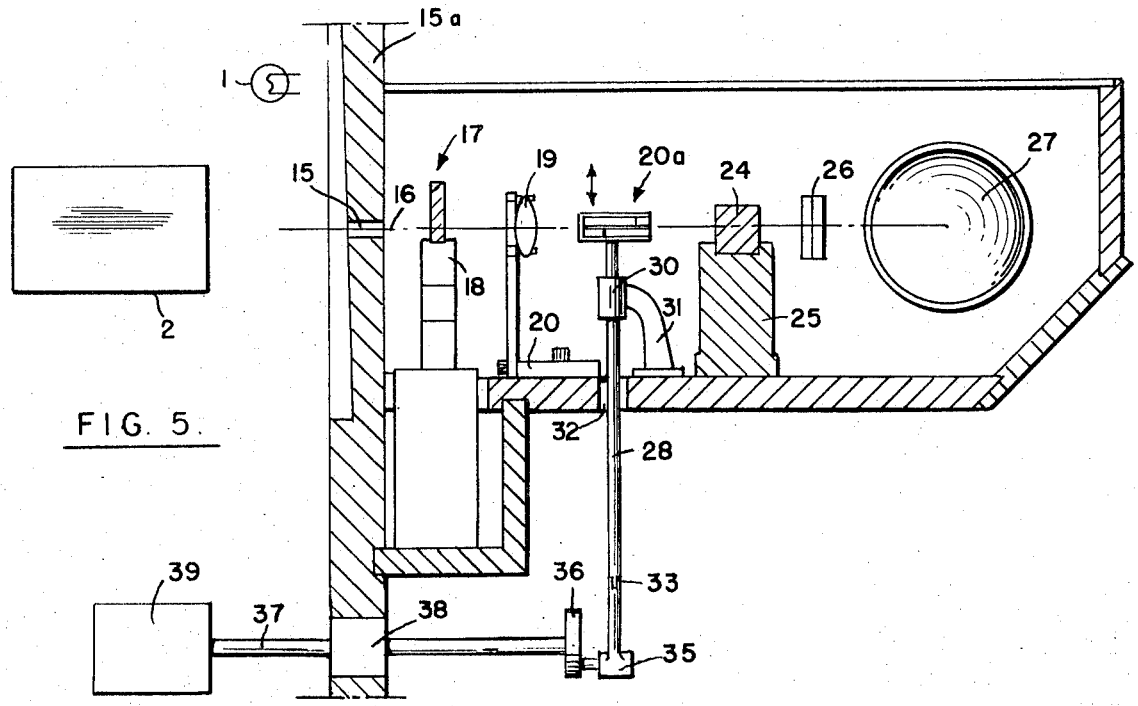
FIG. 5 is a horizontal schematic view showing the optical system of the spectrophotometer using a microcuvette, e.g. that of FIGS. 1 to 4.

Another microcuvette that can be used in the embodiment of FIGS. 5 and 6 is that of FIGS. 7 and 8 of U.S. application Ser. No. 283,308, filed Aug. 24, 1972 now U.S. Pat. No. 3,751,173.

The general assembly of a spectrophotometer using a microcuvette is shown in FIGS. 5 and 6. This embodiment shows a light source 1 from which the light may pass through a monochromator system 2 from which the light beam 16 emerges. The monochromator unit is diagramatically shown since it may be omitted and, when used, it may have known construction comprising lenses, mirrors, diaphragms, and a light-dispersion device, such as a rotatable diffraction grating or prism, to break up the light issuing from the source into components of more or less narrow range wavelength bands, a selected one of which is directed through the path 16. The light-input passes through an aperture 15 in a supporting wall 15a, the aperture serving as a diaphragam. This light may be any collimated light beam of suitable wavelength. While ordinary light may be used, nevertheless, the beam is preferably one that is received from a monochromator so that it has a selected and preferably narrowly-defined wavelength range. The collimated light beam following the path 16 passes through a filter at 17 supported in a mount 18. As shown in FIG. 6 the mount 18 is movable in the direction of the double-headed arrow and supports two filters 17a and 17b with a space therebetween so that the shifting of the amount can insert either filter 17a or 17b in the light path or it may leave a blank space between the two filters in the optical path. The light beam then passes through a lens 19 supported in a mount 20, the base of which is slotted so that screws through the slots may be used to adjust the distance of the lens with respect to the other elements in the path and to focus the light.

The light beam then passes through beam-shifting means of any type which shifts the beam alternately between two parallel paths which are closely spaced apart and parallel to the incident beam. One preferred embodiment of beam shifter is shown at 20a and consists of two transparent plates 21 and 22 mounted in a holder 23 one above the other. To facilitate description, the parallel planes of the front and back edge faces of the plates are considered to extend transversely, more specifically perpendicularly to the "plane" of the device, the plates 21 and 22 being relatively thin as viewed in FIG. 5. The front faces of the plates as viewed in FIG. 6 lie in the planes of a 90° dihedral angle that is dissected by a plane containing the incident light beam. As shown, the plates are rhombs or parallelopipeds and are fixed in the mounting 23 so that the long dimension of one plate (as viewed in FIG. 6) extends at right angles to the long dimension of the other, and the path 16 of the incident light lies in a vertical plane with respect to which the long dimensions of each plate makes a 45° angle. Each plate has a front edge face lying in a vertical plane which may make any angle with the vertical plane containing the incident beam except a 90° angle. Preferably the front face of each plate makes an angle of 45° therein which case the plane of the front face of one plate makes a 90° angle with that of the other plate when viewed as in FIG. 6. The back edge face of each plate is parallel to the front edge face of the respective plate. A thin opaque septum may be placed between the juxtaposed areas of the two rhombs to eliminate any possibility of transmission of light from one to the other.

Means is provided for reciprocating the beam-shifter in a direction which is perpendicular to the "plane" of the device. This moving or shifting means may take many specific forms, but, as shown in FIGS. 5 and 6, it comprises a rod 28 that is fixedly secured in the lug 29 which is fixed on and projects from the back of the mounting 23. This rod 28 is slidable longitudinally in a vertical direction in a bearing 30 carried in a stationary pedestal 31. The rod extends down through an aperture 32 in the base which supports various elements of the optical train shown. Rod 29 may have a square cross-section and the internal cross-section of the bearing 30 in that case has a mating cross-section so the plates 21 and 22 are maintained in proper orientation or alignment as shown in FIG. 6 during reciprocation. Alternatively, the portion of rod 28 which slides in bearing 30 may be provided with a key or it may be splined and the bearing 30 may have a corresponding longitudinally extending groove or keyway for the key or mating ways for the splines. The rod 28 is linked at 33 to a crank arm or connecting rod 34 which is pivotally connected to a crank pin 35 fixed to the rotating disc 36 at a point offset from the axis of rotation of the disc which latter is driven by the shaft 37 supported in a bearing 38 and operated by a motor 39.

Thus beam shifter moves up and down as indicated by the double-headed arrow in FIG. 5 so that each of the plates is alternately positioned in the light beam. The beam refracted by the beam shifter follows one (and then the other alternately) of the two dotted line paths shown in FIG. 6 and passes through one of the cavities in the cuvette 24 which is mounted in the holder 25 and then passes through one or the other faces of the transparent double-wedge 26 depending upon the cavity through which the beam-shifter has directed the light beam. From the double-wedge, the beam passes to a photomultiplier 27, which may be any type of photocell tube which transmits a signal to suitable electronic equipment such as an amplifier, a recorder, etc. The cuvette is positioned against two vertical rods 24a to align the bores of the cuvette so their cavities are in alignment with the beams coming the beam shifter. An upstanding leaf spring 24b presses the cuvette against the rods.

Any suitable system may be used to introduce the sample and/or reference liquids into the cuvette cavities. For example, a system, in which the liquid is forced into the cavities under pressure, of the type disclosed in U.S. application for patent Ser. No. 248,919, filed May 1, 1972 is used. This eliminates the need for degassing, such as when volatile solvents are involved.

The present invention provides a compact optical system for a shifted-beam spectrophotometer by virtue of the novel double-cavity cuvette in which the sample and reference liquids pass through cavities which are extremely closely spaced, thus enabling the use of an optical system having extremely small optical components.

Using the construction of the cuvette described herein, the total volume of cuvette for one cavity can be made less than 50 microliters when the standard 1-centimeter path length of cuvette cavity is employed. For this purpose the bore of the cavity may be 1 millimeter in diameter. Smaller or larger diameters may be used. This micro-sample capacity is important when only a small sample is available, such as in some research projects, especially those involving pediatrics. This micro-sample capacity is also useful for routine tests where expensive reagents are involved. It also aids in stabilization of the temperature of the liquids in the cuvette when heating or cooling is employed. Thermal stabilization and/or heat transfer are significantly aided by the configuration of the microcuvette.

The use of a microcuvette with high rates of charging not only permits rapid operation but achieves low levels of cross-contamination without using a gas purge or a diluent washout between samples. Even with a small sample supply available, a small part of it serves adequately to effectively flush out the previous test sample during the first part of the feeding of the new sample into the cuvette cavity.

The cuvettes of the present invention are relatively inexpensive to make and their construction is such that the light paths through the reference and sample cavities can be precisely matched, since the end plates 12 and 13 used in the assembly can be made of precise thickness and optical properties in their central areas through which the light beam must be passed into the respective cuvette cavities.

The optical system used in the microspectrophotometer is essentially a single beam system in which the beam is shifted and follows different paths in relatively few of the optical components of the system. In the embodiment of FIGS. 5 and 6, these components are the plates 21 and 22 of the beam-shifting device 20a and the double-wedge 26. These components are quite small so that the two portions thereof through which the beam passes can be precisely shaped and mounted to provide precise matching and duplication thereof. Thus the front and back edge faces of the transparent plates 21 and 22 are easily finished so that these surfaces in each plate are perfectly parallel and perpendicular to the upper and lower surfaces of the plate. They are fixed in the mounting 23 and the mounting is supported so that the vertical plane containing the incident beam 16 makes the same angle with the front edge faces of the plates when the beam-shifting device is mounted in the manner shown in Figure. This device 20a may be oriented at other angles than that shown by rotating the whole device about the incident beam shown in FIG. 5 as an axis, the direction of reciprocation relative to the beam being maintained in a plane perpendicular to the lateral faces of the plates. When the beam-shifting device is re-oriented, the double-wedge 26 must also be correspondingly re-oriented. The entry and exit surfaces of the double-wedge are also easily finished to provide precisely planar configuration and the wedge can easily be mounted precisely in proper relationship to the beam-shifter and the photomultiplier to assure that the path of the beam, whichever way it is shifted, encounters identical optical characteristics and has precisely the same effect on the photomultiplier when the cavities the shifted beams transverse contain the identical substances. The cuvette and shifted-beam system also cooperate to minimize alignment problems.

The closeness of the two cavities in the cuvette also makes it possible to use optical components, all of which may be quite small.

The small spacing of the two cavities of the cuvette also makes it possible to use a relatively simple and inexpensive mechanism to reciprocate the beam-shifting device.

The cuvette and optical system disclosed herein make it possible to produce instruments that are characterized by excellent stability, both long and short term. Stability is one measure indicative of the precision of the instrument. It is defined as the characteristic of the instrument that produces the same result repeatedly from a given sample. Such instruments are also charaacterized by excellent freedom from drift, both long and short term, drift being defined as a measure of the deviation from zero when identical samples are repeatedly placed in both cavities of the cuvette. Such instruments are also characterized by good "beam balance," a measure of variation of zero with blanks in both cuvettes as the wavelength is varied.

It is to be understood that changes and variations may be made without departing from the spirit and scope of the invention as defined by the claims.

We claim:

1. A cuvette of throughflow type having a main body formed of two blocks, an opaque septum positioned in a plane between the two blocks and adhered thereto, and two end plates each having an inside face adhered on a respective one of the opposite ends of the body thereby leaving an exposed face on each end plate, a pair of parallel longitudinal cylindrical passages extending through the main body, one of the passages extending through each of the blocks, the passages terminating in planes that are parallel to each other and extend perpendicularly to the length of the passages, the inside faces of the end plates closing the ends of the passages to provide end walls of the passages which lie in planes that are perpendicular to the passages, the exposed faces of the end plates, at least in those portions adjacent the end walls, lying in planes parallel to those of the end walls, the end plates being transparent throughout their thickness at least in those portions in alignment with the ends of the passages, a plurality of transverse channels, each thereof communicating with one of the respective ends of the passages, and a plurality of sockets communicating with the channels for receiving the ends of conduits to supply and/or discharge a liquid through the channels of the passages.

2. A cuvette of throughflow type having a main body and two end plates each having an inside face adhered on a respective one of the opposite ends of the body thereby leaving an exposed face on each end plate, a pair of longitudinal cylindrical passages extending through the main body, the passages terminating in planes that are parallel to each other and extend perpendicularly to the length of the passages, the inside faces of the end plates closing the ends of the passages to provide end walls of the passages which lie in planes that are perpendicular to the passages, the exposed faces of the end plates, at least in those portions adjacent the end walls, lying in planes parallel to those of the end walls, the end plates being transparent throughout their thickness at least in those portions in alignment with the ends of the passages, a plurality of transverse channels at the end of the cylindrical passages, each channel communicating with one of the respective ends of the passages, and a plurality of sockets communicating with the channels for receiving the ends of the conduits to supply and/or discharge a liquid through the channels to the passages, each channel tapering from the full diameter of the passage to a smaller dimension perpendicular to the length of the passage and to a wider dimension lengthwise of the passage so that the two dimensions of the cross-section of the channel are of comparable size where the channel joins its respective socket.

* * * * *